(12) United States Patent
Steffen

(10) Patent No.: US 9,189,264 B1
(45) Date of Patent: Nov. 17, 2015

(54) NOTIFICATION PROPAGATION IN VIRTUAL COMPUTING ENVIRONMENT

(71) Applicant: Western Digital Technologies, Inc., Irvine, CA (US)

(72) Inventor: David N. Steffen, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/299,332

(22) Filed: Jun. 9, 2014

(51) Int. Cl.
- G06F 9/54 (2006.01)
- G06F 9/455 (2006.01)
- G06F 9/45 (2006.01)

(52) U.S. Cl.
CPC .................. G06F 9/45533 (2013.01)

(58) Field of Classification Search
None
See application file for complete search history.

(56) References Cited

U.S. PATENT DOCUMENTS

| | | | |
|---|---|---|---|
| 6,499,054 B1 | 12/2002 | Hesselink et al. |
| 6,732,158 B1 | 5/2004 | Hesselink et al. |
| 7,120,692 B2 | 10/2006 | Hesselink et al. |
| 7,454,443 B2 | 11/2008 | Ram et al. |
| 7,467,187 B2 | 12/2008 | Hesselink et al. |
| 7,546,353 B2 | 6/2009 | Hesselink et al. |
| 7,587,467 B2 | 9/2009 | Hesselink et al. |
| 7,600,036 B2 | 10/2009 | Hesselink et al. |
| 7,788,404 B2 | 8/2010 | Hesselink et al. |
| 7,917,628 B2 | 3/2011 | Hesselink et al. |
| 7,934,251 B2 | 4/2011 | Hesselink et al. |
| 8,004,791 B2 | 8/2011 | Szeremeta et al. |
| 8,255,661 B2 | 8/2012 | Karr et al. |
| 8,285,965 B2 | 10/2012 | Karr et al. |
| 8,341,117 B2 | 12/2012 | Ram et al. |
| 8,341,275 B1 | 12/2012 | Hesselink et al. |
| 8,352,567 B2 | 1/2013 | Hesselink et al. |
| 8,375,200 B2 | 2/2013 | Chen et al. |
| 8,439,759 B1 | 5/2013 | Mello et al. |
| 8,526,798 B2 | 9/2013 | Hesselink |
| 8,631,284 B2 | 1/2014 | Stevens |
| 8,646,054 B1 | 2/2014 | Karr et al. |
| 8,661,507 B1 | 2/2014 | Hesselink et al. |
| 8,688,797 B2 | 4/2014 | Hesselink et al. |
| 2005/0144195 A1 | 6/2005 | Hesselink et al. |
| 2005/0144200 A1 | 6/2005 | Hesselink et al. |
| 2012/0036041 A1 | 2/2012 | Hesselink |
| 2012/0084793 A1* | 4/2012 | Reeves et al. ................. 719/313 |
| 2013/0212401 A1 | 8/2013 | Lin |
| 2013/0263127 A1* | 10/2013 | y Arcas et al. ................ 718/1 |
| 2013/0266137 A1 | 10/2013 | Blankenbeckler et al. |
| 2013/0268749 A1 | 10/2013 | Blankenbeckler et al. |
| 2013/0268759 A1 | 10/2013 | Blankenbeckler et al. |
| 2013/0268771 A1 | 10/2013 | Blankenbeckler et al. |
| 2014/0031117 A1 | 1/2014 | Mello et al. |

FOREIGN PATENT DOCUMENTS

WO    2005022321    3/2005

* cited by examiner

*Primary Examiner* — Andy Ho
*Assistant Examiner* — Abdou Seye

(57) ABSTRACT

Systems and methods are disclosed for propagating notifications between computing environments, such as virtual computing environments. A computing device includes a processor configured to execute a user application in a first virtual computing environment, intercept notification information associated with a notification event associated with the user application, and provide the notification information to a second virtual computing environment.

19 Claims, 4 Drawing Sheets

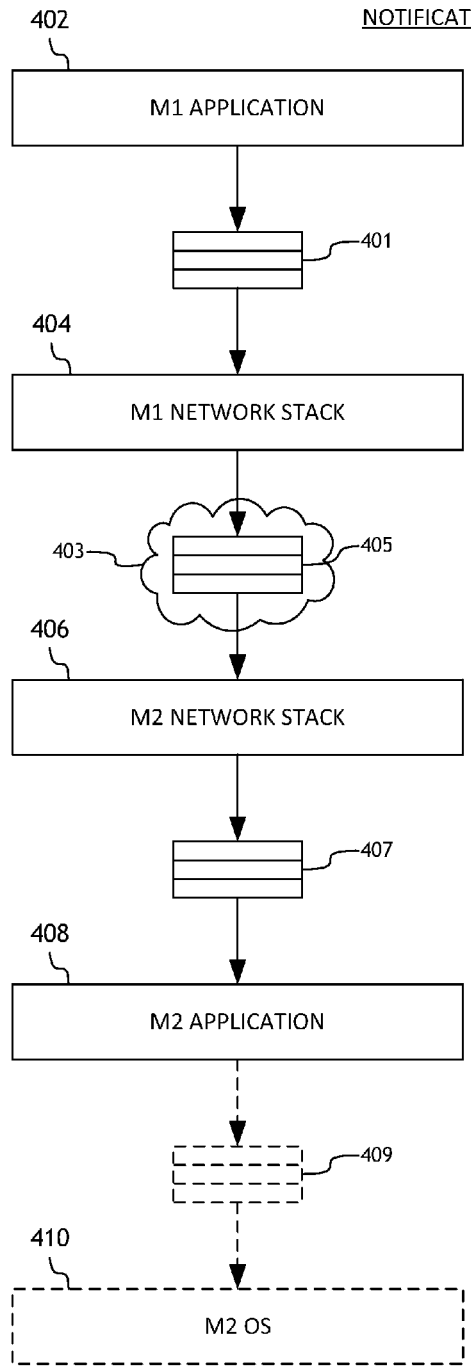
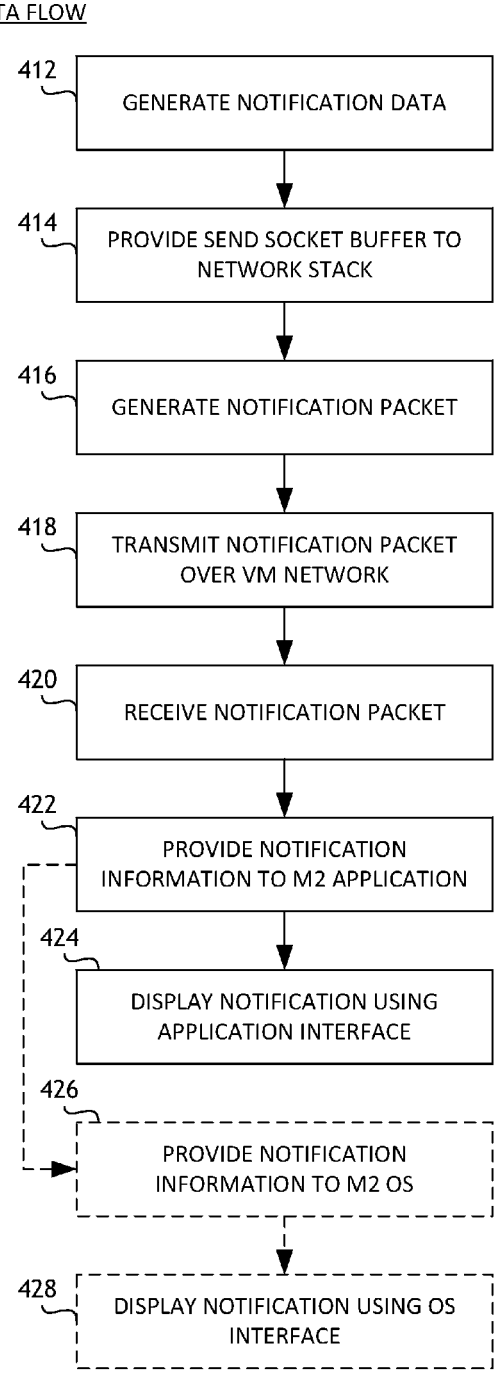
FIG. 4A
FIG. 4B

NOTIFICATION PROPAGATION IN VIRTUAL COMPUTING ENVIRONMENT

BACKGROUND

1. Field

This disclosure relates to computing systems. More particularly, the disclosure relates to systems and methods for providing notifications in a virtual computing environment.

2. Description of Related Art

Certain computing devices are configured to support virtualization, wherein a plurality of logically distinct operating systems are run on a single hardware platform. In virtual computing environments, it is often desirable to display or otherwise provide software and/or hardware-related notifications.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

FIG. 4A is a flow diagram illustrating a process for managing data storage according to an embodiment.

FIG. 4B is a flow diagram illustrating a process for providing notifications in a computing system according to an embodiment.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Terminology

As used herein, the term "virtual machine" may refer to a guest operating system (OS) running on a host computer system, or may refer to a guest OS along with any applications associated with the guest OS. "Virtual machine" may further be used herein to refer to the host OS itself or to the combination of the host OS with its applications. Whether virtual or non-virtual, an instantiation of an operating system along with its associated user-level applications may be referred to herein as an OS stack, computing environment, computing system, OS instance, virtual machine, or the like, and may represent an OS and associated applications running in an isolated partition within a single physical computer system.

Overview

Certain computing devices can be configured to run one or more virtual computing environments (virtual machines) on top of a host operating system (OS). When running one or more virtual operating system along with a host operating system, one or more of the operating system (OS) instances ("foreground" OS stack) may be provided access to the system hardware and made available for viewing/interaction by the user, while one or more other OS instances ("background" OS stack) are without control over the system hardware and substantially occluded from view/interaction by the user.

In certain situations, a background OS stack may generate user notifications to inform a user of the occurrence of an event. Important user notifications may include hardware notifications (e.g., low battery, hardware failure) and other notifications, such as social media updates, instant message (IM), short message service (SMS), voice call or message, VoIP call or message receipt, and e-mail, for example. User notifications may be provided via a graphical user interface (GUI) associated with a user application or system application. However, because a background OS stack may be occluded from view to some extent by the user, notifications generated while in a background state may go unnoticed by the user. That is, user notifications that occur on a machine with virtualization active may go unnoticed by the user due to the user/system focus being active on the host OS or another virtual machine client.

Certain embodiments disclosed herein provide for the propagation of important user interface notifications between operating system environments on a machine where multiple OS stacks are running.

Virtual Computing Environments

Figure 1:
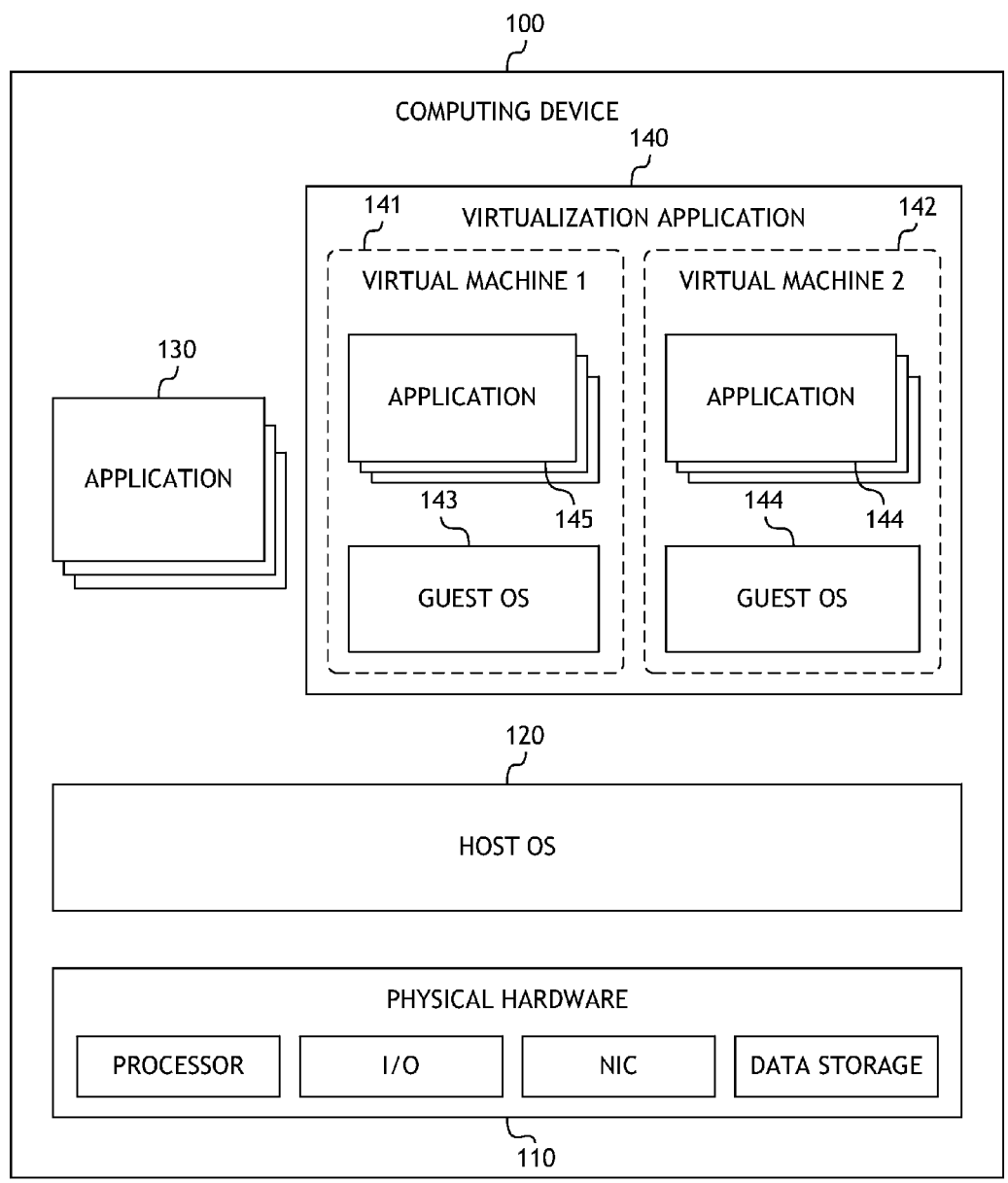
FIG. 1 is a block diagram representing a computing device comprising virtualization functionality according to an embodiment.

FIG. 1 is a block diagram representing a computing device 100 comprising virtualization functionality according to an embodiment. The computing device may be a desktop computer, laptop, tablet, server device, personal digital assistant (PDA), television, wireless handheld device (such as a smartphone), set-top box, wearable computing device, combination of the same, or the like.

The computing device includes a physical hardware platform 110, which may comprise, for example, a variation of the x86 architecture platform. The hardware platform may include a processor (e.g., central processing unit (CPU)), one or more I/O devices, such as a mouse, keyboard (not shown), audio device, and the like, a Network Interface Card (NIC), data storage, such as one or more mass storage devices (e.g., a hard disk drive) 110 and/or other hardware components.

A host operating system 120 may be installed on the physical hardware platform 110. Furthermore, in certain embodiments, the host operating system 120 may be configured to implement a virtualization application 140, which may operate above an abstraction level provided by the host operating system 120. The virtualization application 140 may be installed on top of hardware platform 110 to support a virtual machine execution space within which one or more encapsulated virtual machines (VMs, 141, 142) may be instantiated and executed. The virtualization application 140 may comprise software designed to create a virtual machine environment for the VMs 141, 142 in the computing device. In certain embodiments, a virtual machine monitor kernel (VMM kernel) runs alongside the host OS 120. Access requests by a virtual machine to an I/O device may be redirected by the VMM kernel to virtual drivers in a user level monitor (ULM), which may be configured to call the native programming interface (API) of the host OS 120 for completion. The VMM kernel may provide the master control program that manages one or more guest operating systems (e.g., 143, 144) associated with virtual machines instantiated using the virtualization application 140. In certain embodiments, the virtualization application 140 does not communicate directly with the physical hardware 110, but may communicate with the device hardware 110 via the host operating system 120.

The host OS 120 may map the physical hardware resources to a set of corresponding virtual resources for the virtual machines 141, 142. The virtual hardware platform may function as the equivalent of a standard hardware architecture (e.g., x86), such that architecturally-supported operating system (e.g., Microsoft Windows, Linux, Mac OSX, etc.) may be installed as a guest operating system (143, 144) in order to facilitate application execution within the VMs 141, 142.

Each guest OS (e.g., 143) may manage its own applications (e.g., 145) as in a non-virtual environment, except that it has been isolated in the computer by the host OS 120. While certain embodiments are disclosed herein in the context of host-OS-hosted virtual machine monitoring, various other VM monitor models or configurations may be utilized within the scope of the present disclosure, such as hypervisor models, service operating system models, or other models. Furthermore, it should be recognized that the various terms, layers, and categorizations used to describe the virtualization components shown in FIG. 1 may be referred to differently without departing from their functionality or the spirit or scope of the present disclosure.

The guest operating system(s) (143, 144) may provide an application space providing execution (process), memory, communication, and/or storage abstractions. For example, Virtual Machine 1 (141) includes one or more applications 145 configured to run within the application space. As an example, when an application 145 is launched in Virtual Machine 1, the guest OS 143 may communicate with the host OS 120 to allocate a virtual address space to the application 145 and loads the instructions (i.e., code) that execute the application 145 into a portion of a virtual address space. Each guest OS with its associated applications may be referred to herein as a "virtual machine," VM, "guest OS stack," or the like. A page table may be used to map the virtual address space into a portion of memory that is controlled by the guest OS 143.

Although certain concepts and features are disclosed herein in the context of virtual computing environments, one having ordinary skill in the art will appreciate that concepts and features may apply to virtual as well as non-virtual computing systems.

As described above, a computing environment may include functionality for providing event notifications associated with hardware and/or software states to an application and/or operating system running in the computing environment. For example, an application running in a computing environment may provide functionality for detecting certain events, for example hardware-related events generated by hardware components such as power level events associated with a power supply, or the like. Additionally, or alternatively, an application's API may allow for receipt of application-related messages over a network, or other application-related event notifications, wherein the application provides a graphical user interface (GUI), audio output signal, or other output mechanism to communicate the occurrence of such event.

When a respective computing environment currently has access to the device hardware, notification output may be provided to a user in accord with normal system operation. However, as demonstrated in the diagram of FIG. 1, a single computing device may run a plurality of operating system stacks simultaneously. Each respective computing environment (e.g., host OS 120 stack, Virtual Machine 1 guest OS stack 141, Virtual Machine 2 guest OS stack 142) may be configured to generate and/or receive information associated with notification events. However, in certain situations, a computing environment may receive or generate a notification signal when the associated operating system does not have control of the system hardware. That is, the operating system may be operating in the background, or otherwise occluded from user view, thereby substantially preventing communication of user notifications associated with the background system. While certain virtual computing systems do not provide a mechanism for receiving hardware/software notifications associated with background system(s) when another foreground computing environment is running, embodiments disclosed herein provide for propagation of notification information between operating systems operating in a single computing device. Furthermore, such notifications propagated from background to foreground environments may include notification origin data/metadata.

Notification Interception

Figure 2:
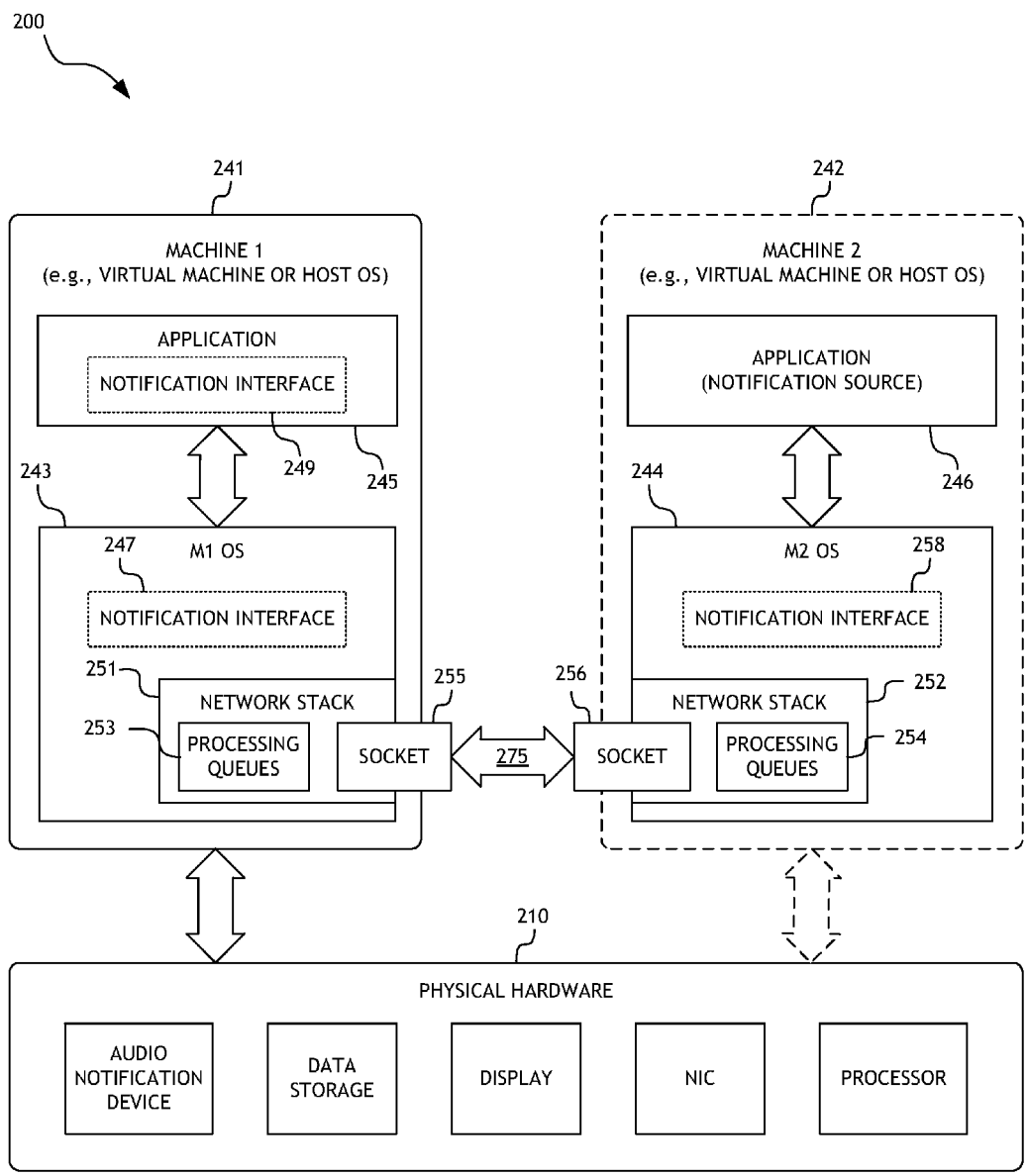
FIG. 2 is a block diagram of a computing system according to an embodiment.

FIG. 2 is a block diagram of a computing system 200 according to an embodiment. The system includes a plurality of computing environments (241, 242) configured to communicate over a network connection 275. Each of the computing environments may correspond to a host operating system environment or a virtual guest operating system environment running on the host. Therefore, each of the computing environments 241, 242 corresponds to an operating system instance, including associated user-level applications.

In an embodiment, the first OS stack 241 may be a foreground environment, whereas the second OS stack 242 may be a background environment, as indicated by the dashed-line designation. That is, at a given point in time, and for the purposes of explanation herein, the OS stack 241 may have access to the system hardware platform 210, including, for example, a monitor or other display device, audio output device, such as a speaker, and/or other output device that may be utilized for user notification purposes. Each of the OS stacks 241, 242 may be a virtual machine or host OS stack. As discussed above, a potential problem may arise in virtual computing systems when a given OS stack generates a user notification at a time when it does not have access to system hardware and/or is otherwise occluded from view by the user(s). Certain embodiments disclosed herein provide for interception and/or display of such notifications in a foreground computing environment.

Application notifications may be used by applications, such as application 246, to display information in a user interface generated by the application, or through another type of output mechanism. For example, an operating system kernel (e.g., the kernel associated with M2 OS 244) may be connected to one or more applications and/or daemons, each of which may access the hardware components in a manner dictated by the kernel. The application 246 may correspond to a user application, which may be started and terminated by the user, or may correspond to a system application, which is operated under the control of the operating system, and which the user is not necessarily aware of.

System applications may be background processes, wherein the user is only aware that these applications are running when they notify the user of the occurrence of an event. System applications may perform various functions, such as keeping track of hardware states (e.g., battery charge level), or the state of removable memory or networking hardware. System applications may be referred to herein in certain contexts as "daemons."

User and system applications may be designed to monitor and/or react to the occurrence of certain events. In an embodiment, the application 246 may be a user application, such as an email application, which may continuously monitor an inbox and register the arrival of a new email as an event of interest. Alternatively, the application 246 may be a chat application, which may register a new message from a chat participant as an event of interest. As another alternative, the application 246 may be a system application that reacts to events such as the change of state of a hardware resource or the availability of software updates, for example. Such events may originate from internal system changes or from external changes.

Both user and system applications may be designed to react to the occurrence of events at least in part by generating a notification or notification data. In certain embodiments, a notification comprises a message to inform the user of the occurrence of the event. Notifications may generally be associated with a particular application. Furthermore, notification information may be generated by a variety of sources, such as from software (e.g., the application 246), from a web service via the Internet, from the physical hardware 210, or from another source.

Depending on the nature and/or source of notification information, a user notification may be displayed using a notification interface component associated with the application (e.g., 246), or with the relevant operating system (e.g., 258). For example, the operating system may manage a system tray (e.g., a taskbar) that is configured to provide, for example, a bar displayed on an operating system GUI desktop that includes a notification mechanism, such as the appearance/animation of an icon, or the like, which may be accompanied by a notification sound. For example, in the case of a system tray notification, notification information generated by the application 246 may be passed to the kernel of the M2 OS 244, which may cause the notification to be displayed using the notification interface 258. Application developers may be permitted to specify how and/or when the notifications are to be displayed as part of the OS or user application GUI.

A notification interface module that is associated with an application (e.g., 245) or an operating system (e.g., M1 OS 243) may display notification information as part of a temporary GUI pop-up window, or as an interface window or feature that remains visible until terminated by some act of a user or another condition. In an embodiment, temporary notification windows may include information informing the user of the new notification and providing some amount of detail of the notification event.

As described above, when one OS stack overlays another, notifications generated by or associated with the background OS stack may become unviewable by the user. Furthermore, the background system may have lost control over sound devices and other hardware that may be used to communicate a notification. Certain embodiments disclosed herein provide for interception of user interface notifications on every OS stack running on a computing device, wherein the intercepted notifications are propagated to one or more other separate OS instances running on the device. For example, a background system may be configured to execute software that can intercept notification information and share the information across a network connection. In certain embodiments, the intercepted notification is converted to the notification method native to the foremost OS stack. Furthermore notification information propagated to the foremost OS stack may include additional information relating to the origin and/or nature of the notification event.

In the system 200 of FIG. 2, the virtual machine 241 (or host OS stack) is illustrated as the foremost OS stack operating on a computing device. Therefore, the OS stack 241 may have control over the physical hardware 210 and may be able to provide user notifications visible to the user through communication between the M1 OS 243 and the physical hardware 210. In an embodiment, the background system 242 is configured to broadcast notification information generated by the application 246 or M2 OS 244, or otherwise associated with the background system. For example, the OS stack 242 may be configured to use the native software API for the application 246 (i.e., the notification source) to identify and broadcast information associated with an event and use the network interface (e.g., network stack 252) of the respective OS to propagate the message. In certain embodiments, a listening application may be set up in connection with network processing queues (254, 253) at each operating system. The listening application (e.g., socket 256) may maintain notification information to the processing queues 254 on the background system, wherein the contents of the processing queues 254 are provided at a network port for transmission over a network connection 275. The listening application may register simply the occurrence of an event, or the details/data associated with the event. For example, for an email notification, the data passed between the background and foreground systems may include simply an indication that an email was received, a partial copy of the email contents, or full copy of the email contents.

In an embodiment, the host OS may open up a listening socket, wherein other operating systems running on the device may connect to the socket to receive and/or transmit notification information. That is, an application running on the host OS stack may open up a socket and listen for broadcasts on the socket from systems running on top of the host OS or from the host OS, wherein each machine running on top of the host OS may open up its own listening socket. Virtual machines may utilize network address translation for inter-system communication. The locally-running OS stacks may thereby effectively connect over a private LAN, thereby allowing for enhanced security.

Once the socket interfaces and processing queues have been created for each of the operating systems running on the device, the network stacks of the operating systems may communicate notification information with one another. For example, socket communication from the background system 242 to the foreground system 241 may be performed according to a message queue-based communication method using the processing queues 253, 251. That is, socket communication from the background system 242 to the foreground system 241 may be performed such that the processing queue 254 stores notification data associated with the application 246, and the foreground application 245 and/or OS 243 obtain the notification information from the processing queue 254. A similar process may be implemented for communicating notification information from Machine 1 1 to Machine 2.

The various components of the system 200 may be configured to utilize standard TCP/IP, UDP, or other type of ports. The sockets 255, 256 may be associated with a particular port designation, wherein a system may be configured to listen at the port designation in order to receive data broadcast by other network-connected systems to the designated port.

The intercepted notification information may be converted by the background system (i.e., the notification source) 242 and/or the foreground system 241 such that the foreground system may display the notification in a native format, such as by presenting a system or application GUI including a user notification.

Figure 3:
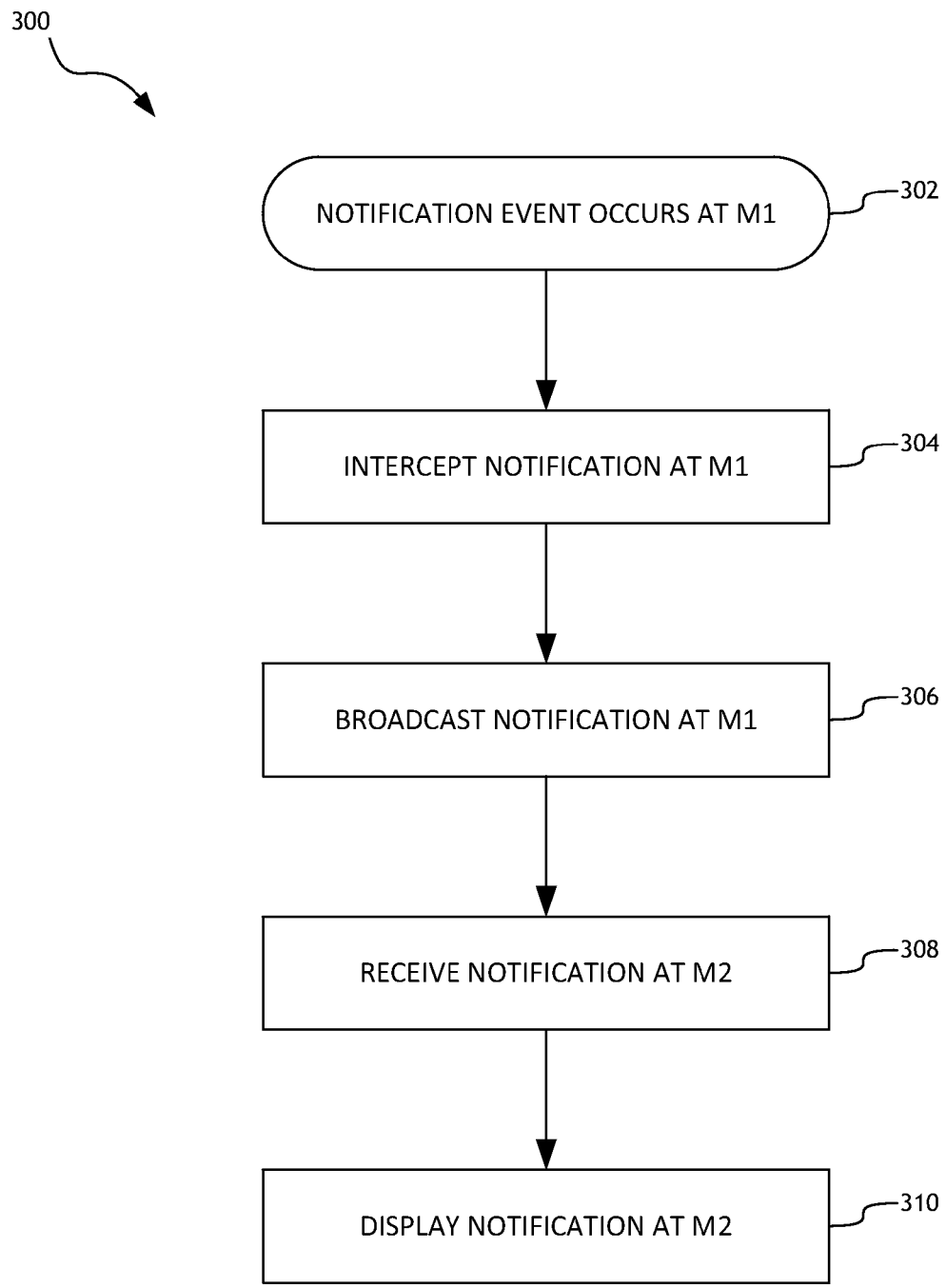
FIG. 3 is a flow diagram illustrating a process for providing notifications in a computing system according to an embodiment.

FIG. 3 is a flow diagram illustrating a process 300 for providing notifications in a computing system according to an embodiment. In certain embodiments, the process 300 may begin with the occurrence of a notification event at a first virtual machine. While some features and/or process steps are disclosed herein with reference to a virtual machine system, it should be understood that such systems may not be virtual machines, but may instead be a host operating system stack, wherein one or more virtual machines may operate on top of the host operating system.

At block 304, the first virtual machine intercepts the notification, or information indicating occurrence of the event. In certain embodiments, a virtual machine or other system may register or otherwise indicate the types of intercepts/notifications that are of interest, wherein only notification events of interest are intercepted by the first virtual machine. As an example, the notification may be a system tray notification, an SMS notification, an email receipt notification, or the like.

At block 306, the first virtual machine broadcasts the intercepted notification information to a second virtual machine or to the host operating system. Prior to broadcasting the notification information, the first virtual machine may translate the information to a format usable by the second virtual machine. Broadcasting may be performed by providing the notification information to a socket/port designated for such transmissions.

The second virtual machine may receive the broadcast from the first virtual machine at block 308 and display the notification at the second virtual machine at block 310. The second virtual machine may use an operating system or application-specific GUI to notify a user regarding the notification event. The display may comprise any of the following information: notification origin; notification time; copied notification data; etc.

While the process 300 describes notification propagation from the first virtual machine to the second virtual machine, notification propagation may be bi-directional, wherein the second virtual machine is likewise configured to provide notification information to the first virtual machine. In addition, although only two virtual machines/host operating system stacks are described, the process may be implemented among a larger number of systems. For example, a first virtual machine or host operating system stack may intercept local notification information and propagate such information to a plurality of other virtual machines or systems.

Notification Data Flow

FIG. 4A is a data flow diagram illustrating a process for managing data storage according to an embodiment, whereas FIG. 4B is a flow diagram illustrating a process for providing notifications in a computing system corresponding to the data flow of FIG. 4A.

At block 412, notification information may be generated at a first OS instantiation (e.g., virtual machine or host OS stack), referred to for simplicity below as the "first system." For example, an application 401 running on the first system may generate the notification information in connection with the occurrence of a hardware or software-related event. The process illustrated in FIG. 4 provides an embodiment of notification data flow control between the first system and a second system (e.g., virtual machine or host OS stack). In an embodiment, the application 401 generates the notification data and adds it to a send socket buffer 401, which is provided to the network stack 404 of the first system. If there is no free space in the buffer, the notification propagation call may fail.

The network stack 404 may save the notification data to transmit in a processing queue, which may be necessary or desirable to buffer data when, for example, the packet rate from the OS kernel is faster than the packet rate from the network interface. At block 418, the notification data 405 is transmitted over a network connection 403 to the network stack of the second system (M2).

At block 420, M2 receives the notification segment. Receipt by the network stack of M2 may involve writing the received packet into memory and/or performing one or more validity checks. The network stack may further send the packet to a memory buffer allocated by the M2 operating system (or, e.g., host OS) for receiving packets. In certain embodiments, the network driver may translate the packet to a packet structure native to the operating system. The M2 network stack may propagate the notification data through the relevant network layers according to, for example, TCP/IP protocol, or other network protocol.

The network stack 406 of the second system may save the received notification data in a processing queue that is part of the network stack 406. The payload data of the received notification data packet(s) may be saved in a receive socket buffer 407. An application running on the second system may obtain the notification data from the socket buffer. At block 424, the application of the second system displays a notification to a user using the notification data.

In certain embodiments, the notification data may be provided to a system notification module associated with the operating system of the second system, wherein the operating system may display the notification, as shown at block 428.

Additional Embodiments

Those skilled in the art will appreciate that in some embodiments, other types of distributed remote data access systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-progarmmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:
1. A computing device comprising:
a display;

a processor; and a computer-readable medium having stored thereon instructions that, when executed by the processor, cause the processor to:
- execute a user application in a first virtual computing environment while the first virtual computing environment is in a background state, wherein the first virtual computing environment does not have control over the display while in the background state;
- intercept notification information associated with a first notification event associated with the user application;
- using the first virtual computing environment, automatically convert the notification information to a format native to a second virtual computing environment of a different type than the first virtual computing environment;
- store the notification information in a network processing queue;
- provide the notification information to the second virtual computing environment using a network protocol; and
- receive, using the first virtual computing environment, additional notification information from the second virtual computing environment, the additional notification information being associated with a second notification event that has occurred in the second virtual computing environment.

2. The computing device of claim 1, wherein the instructions further cause the processor to output a user notification in the second virtual computing environment indicating that the first notification event occurred.

3. The computing device of claim 2, wherein the user notification indicates that the first notification event occurred in the first virtual computing environment.

4. The computing device of claim 1, wherein the instructions further cause the processor to display a graphical user interface (GUI) in the second virtual computing environment indicating that the first notification event occurred.

5. The computing device of claim 4, wherein the GUI is associated with a second instantiation of the user application in the second virtual computing environment.

6. The computing device of claim 4, wherein the GUI is associated with an operating system of the second virtual computing environment.

7. The computing device of claim 6, wherein the GUI is a taskbar notification.

8. The computing device of claim 1, wherein the instructions further cause the processor to drive an audio device for providing an audible notification indicating that the first notification event occurred.

9. The computing device of claim 1, wherein the second notification event is associated with at least one of the following: hardware failure, power source level, email receipt, social media notification receipt, Instant Message (IM) receipt, Short Message Service (SMS) message receipt, voice call or message, and VoIP call or message.

10. The computing device of claim 1, wherein one of the first and second virtual computing environments is associated with a Windows operating system and the other of the first and second virtual computing environments is associated with a non-Windows operating system.

11. The computing device of claim 1, wherein the instructions further cause the processor to perform said interception of the notification information using a native software API associated with the first virtual computing environment.

12. The computing device of claim 1, wherein the instructions further cause the processor to perform said interception and provision of the notification information at least in part by creating a socket and providing the notification information to the socket.

13. The computing device of claim 12, wherein the instructions further cause the processor to perform said provision of the notification information to the second virtual computing environment using a network interface of the first virtual computing environment.

14. The computing device of claim 12, wherein the instructions further cause the processor to perform said provision of the notification information to the second virtual computing environment using Internet Protocol.

15. A method of propagating notification information in a computing device having a display, the method comprising:
- executing a user application in a first virtual computing environment running on the computing device while the first virtual computing environment is in a background state, wherein the first virtual computing environment does not have control over the display while in the background state;
- intercepting notification information associated with a first notification event associated with the user application;
- using the first virtual computing environment, automatically converting the notification information to a format native to a second virtual computing environment running on the computing device, the second virtual computing environment being of a different type than the first virtual computing environment;
- storing the notification information in a network processing queue;
- providing the notification information to the second virtual computing environment using a network protocol; and
- receiving, using the first virtual computing environment, additional notification information from the second virtual computing environment, the additional notification information being associated with a second notification event that has occurred in the second virtual computing environment;
- wherein the method is performed at least in part by a processor of the computing device.

16. The method of claim 15, further comprising outputting a user notification in the second virtual computing environment indicating that the first notification event occurred.

17. The method of claim 16, wherein the user notification indicates that the first notification event occurred in the first virtual computing environment.

18. The method of claim 15, further comprising displaying a graphical user interface (GUI) in the second virtual computing environment indicating that the notification event occurred.

19. The method of claim 18, further comprising executing a second instantiation of the user application in the second virtual computing environment, wherein the GUI is associated with the second instantiation of the user application.

* * * * *